United States Patent [19]
Marshall, III et al.

[11] 3,815,413
[45] June 11, 1974

[54] ANEMOMETER WIND DIRECTION DAMPING SYSTEM

[75] Inventors: Thomas E. Marshall, III, Bedford, Va.; Walter A. Von Wald, Jr., Hillcrest Heights, Md.

[73] Assignee: The United States of America as represented by the Secretary of the Navy, Washington, D.C.

[22] Filed: Jan. 17, 1973

[21] Appl. No.: 324,269

[52] U.S. Cl. ................................. 73/188, 73/430
[51] Int. Cl. ............................................. G01w 1/00
[58] Field of Search ........ 73/430, 188, 189, DIG. 1, 73/414, 496; 188/1 B

[56] References Cited
UNITED STATES PATENTS
3,498,416  3/1970  Pfister et al........................ 73/430

OTHER PUBLICATIONS
D. T. Acheson et al., Viscous Damped Wind Vane, NBS Tech. Note 536 pp. 1–3 (June 1970).

Primary Examiner—James J. Gill
Assistant Examiner—Anthony V. Ciarlante
Attorney, Agent, or Firm—R. S. Sciascia; Arthur L. Branning; M. L. Crane

[57] ABSTRACT

This disclosure is directed to a friction means which damps rotational movement of a weather vane due to wind shifts. The friction means is mounted relative to the vertical support shaft about which the vane rotates to align with the wind direction. The friction means prevents quick rotational movements of the support shaft so that more accurate true wind direction is obtained.

4 Claims, 4 Drawing Figures

PATENTED JUN 11 1974    3,815,413

ANEMOMETER WIND DIRECTION DAMPING SYSTEM

BACKGROUND OF THE INVENTION

This invention relates to a fluid velocity and direction indicating device and more particularly to an improvement which dampens rotational movement of the indicator device due to large momentary changes in direction.

Heretofore, vane type fluid direction indicators have been used wherein the direction determining means is free to rotate about the vertical axis without any restrictions. Since no dampening means are provided, such devices present output errors that are beyond tolerances, additional rotational movement increases wear thereby reducing life of the device, and instantaneous sampling is not worthwhile because the sampling may be performed during an irregular fluidic force which changes the direction temporarily from the normal conditions. The normal anemometer is kept facing into the fluid force by the use of a vane. Therefore, the direction is determined through a direct or magnetic couple, either to the rotor of a synchro-transmitter that operates into a servo system, a potentiometer readout, or an encoder type readout. The normal anemometer direction damping is usually aerodynamic, and in most cases, sufficient in very high fluidic forces. However, in day-to-day low fluidic forces, oscillatory motion is experienced by irregular forces from different than normal directions. A mechanically undamped anemometer allows the fluidic force vane to oscillate above and below the true value of fluid direction with over-shots at random. These oscillations depend on the mass of the unit and the energy of the irregularly directed fluid. This invention is an improvement over U.S. Pat. No. 3,336,802 directed to a wind velocity and direction determining device which is provided with only an aerodynamic damping means.

SUMMARY OF THE INVENTION

This invention is directed to a direction determining device which is provided with an internal mechanical damping means to prevent excessive rotation of a fluid controlled vane type direction determining means. The present device includes an oil-lubricated friction means operative between the stationary and rotatable member. The friction added is sufficient to reduce the rotatable or oscillatory motion in both directions while preventing the total damping from dropping below a critical value at any fluid speed. The frictional device permits rotation of the vane controlled element during directional changes of the fluid; however, the magnitude of oscillations due to fluid direction changes, as well as the frequency of occurance, are reduced.

STATEMENT OF THE OBJECTS

It is therefore an object of the present invention to provide an improved aneomometer which provides a more accurate output by damping the oscillatory movement thereof due to motion of fluids being measured.

Another object is to provide an improved aneomometer which increases the life thereof by reducing the wear of certain parts.

Still another object is to provide an improved anemometer by which meaningful outputs may be obtained by instantaneous sampling.

Other objects and advantages of this invention will become obvious from consideration of the following specification when related to the drawing.

DESCRIPTION OF THE IMPROVED DEVICE

Figure 1:
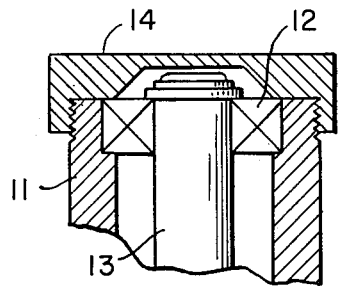
FIG. 1 illustrates an enlarged partial view of the prior art as shown by FIG. 1, in U.S. Pat. No. 3,336,802.

Now referring to the drawing, there is shown by illustration in FIG. 1 a partial view of a prior art anemometer shown by illustration in U.S. Pat. No. 3,336,802. As shown, the partial view illustrates a rotatable housing 11 which is rotatable on bearings 12 located at the top of a cylindrical support 13 within which telemetering equipment is found and about which an anemometer rotates. The housing is enclosed by an end cap 14 which protects the inner structure from the outer elements such as weather. The device is provided with lower bearing, not shown, upon which the anemometer rotates.

Figure 2:
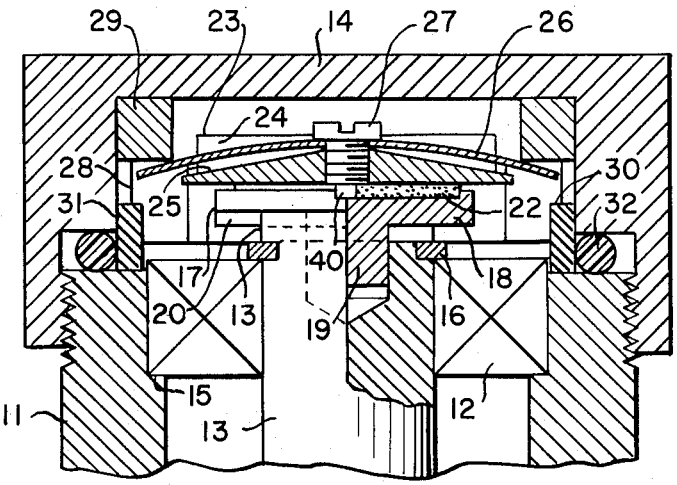
FIG. 2 illustrates a cross sectional view illustrating the improvement over the prior art as set forth by this invention.
Figure 3:
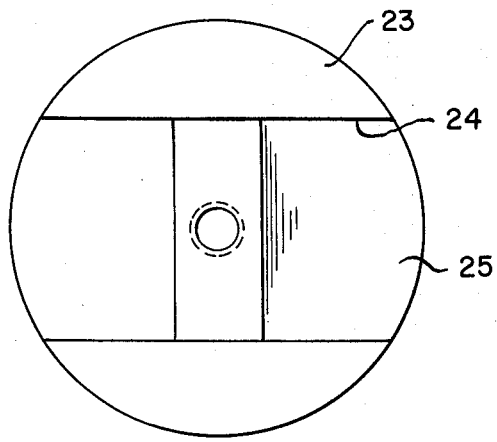
FIG. 3 illustrates a top view of the plate that forms part of a spring assembly.
Figure 4:
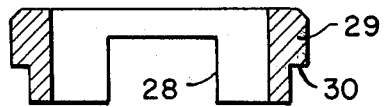
FIG. 4 illustrates a cross sectional view of a cylindrical element within the cap to more clearly illustrate the slot therein.

The improvement illustrated in cross section in FIG. 2 includes a damping means which places rotational restraints onto the anemometer to prevent oscillatory movement of the rotatable means. As shown, the stationary cylindrical support 13 extends above bearings 12 and the side wall of end cap 14 is increased in length to confine therein the damping means. As shown, the bearing 12 is held in place by resting upon a shoulder 15 in the rotatable housing 11 and by a retainer ring 16 that fits into a groove in the support 13 above the bearing. The damping means is located between the end of the stationary cylinder and the closed end of the end cap.

The damping means includes a porous bronze oilite disc 22 retained within a cup formed by an upwardly extending wall 17 and a base 18. The cup is supported by an integral shaft 19 extending downwardly into an axially aligned hole within the upper end of the support 13 with a tight fit. To prevent rotational movement thereof the top of the stationary support 13 is provided with a slot within which rib portion 20 on the bottom of the cup fits. The oilite disc extends upwardly slightly above the upwardly extending wall 18 and is in facial contact with the bottom face of the cylindrical disc member 23 of tool steel and having a bearing grade of chrome plating deposited onto the bottom face. The oilite disc is provided with a central aperture 40 which functions as a reservoir for oil.

The cylindrical disc 23 is slotted across the center with the slot 24 having an inclined surface 25 toward the bottom face from the center. A thin flat metal spring 26 is secured within the slot by use of a screw 27 which is threaded into a threaded hole in the center of the cylindrical disc 23. The metal spring extends beyond the outer edge of cylindrical disc 23 into a slot 28 of a cylindrical member 29 that fits in the cap 14 nested against the inner face thereof and extending downwardly toward the bearings 12 surrounding cylindrical disc 23. The outer surface of cylindrical element 29 is cut away from the bottom upwardly to form a shoulder 30. The cut-away portion receives therein a spacer ring 31 between the inner face of the cap and the cylindrical element 29. The upper end of the spacer ring 31 rests against shoulder 30 and the lower end of the spacer ring rests on the upper end of the rotatable housing of the anemometer. The length of the spacer ring is selected such that the cap can be screw threaded onto the rotatable housing only so far, thus, adjustment is made by use of different length rings. The threaded limit of the cap determines the pressure applied onto flat spring 26 and thereby determines the torque on the anemometer. An O-ring 32 is provided in the spacing between the upper end of the rotatable housing, the spacer ring 31, and the cap 14 to prevent any leakage at the joint between the cap and the anemometer housing. The cap is screwed down only hand tight to avoid applying too much force onto the flat spring.

In assembly, the anemometer housing is slipped over the shaft into place. The bearing 12 is moved into place and secured by retainer ring 16. The oilite disc is treated with an appropriate oil which is absorbed by the disc until saturated. The oilite disc is placed free floating onto the cup which has been secured into place on top of the stationary support 13. Additional oil may be applied to the disc by filling the central aperture 40 which acts as a reservoir. The spacer ring 31 and O-ring 32 may be placed into position about the bearing. The flat spring assembly may be placed over the oilite disc and the cylindrical element 29 placed over the spring assembly with the spring in the slot 28 within the cylindrical assembly. The lower end of the cylindrical element 29 fits within the confines of the spacer 31 and the spacer rests upon the shoulder 30 in the outer surface of the lower end of the cylindrical element. The cap 14 is then placed over the cylindrical element and screw threaded onto the housing.

If one prefers, the cylindrical element, spring assembly and spacer ring may be placed into the end cap and with the O-ring in place the assembly placed onto the end of the housing and threaded into place. The end cap is threaded into place - hand tight in order to avoid placing undue pressure onto the spring.

When the modified structure is in place, the face of the cylindrical disc 23 to which the spring is attached rides on the oilite disc 22 thereby applying a pressure on the oilite disc. This applied pressure between the facing of the cylindrical member and the oilite disc prevents the anemometer from turning freely. Therefore, the anemometer is damped to prevent unnecessary oscillations. Frictional forces between the lower face of the cylindrical disc 23 and the oilite disc 22 should be 34 ± 6 gram inches for the present anemometer. Therefore, this frictional force must be overcome to move the vane element thereby reducing the standard of deviation to below ± 10°.

It is noted that the oilite disc extends above the side wall of the cup, therefore, the friction is between the oilite disc and the bottom face of the cylindrical disc to which the spring is attached. The area and surface of the top rim of the side wall 18 of the cup is so constructed that should the oilite disc wear to allow the bottom surface of the plate to contact the rim, the torque required to move the vane will not increase. Therefore, the ability to damp the oscillation of the anemometer will be retained.

All parts are made standard, interchangable with other units, thereby permitting freedom of manufacture of the parts. The only part which may be different is the height of the spacer ring which may be selected from a group of rings having different heights, depending on the desired torque.

In operation, the anemometer is rotated by the wind by aid of the vane such that the rotating propeller is headed into the wind. As the anemometer housing rotates, the spring assembly rotates with the housing while the oilite disc remains stationary. If there is a sudden gust or change in wind direction, the anemometer would normally rotate to align itself with the wind causing an oscillatory motion of the anemometer. Due to the frictional forces between the face of the spring assembly and the oilite disc, the anemometer will be slowed in its rotational movement and oscillatory motion will be damped.

Since the device is placed in areas in which it could be affected by water. Most of the metal parts may be made of aluminum. The spring is made of beryllium copper alloy and the disc that holds the spring is made of steel so that the face contacting the oilite disc may have long life.

What is claimed is:

1. A damping means for an anemometer which restricts oscillatory motion thereof, which comprises;
    an upright stationary support,
    an anemometer housing rotatable about said support and supported thereby,
    an end cap adjustably secured to the end of said housing for enclosing said housing,
    a cylindrical element secured within said cap,
    said cylindrical element including opposing slots therein along its length,
    an oil saturated means supported on the upper end of said stationary support in axial alignment therewith,
    a flat face disc secured in axial alignment juxtaposed said oil saturated means in facial contact therewith,
    a leaf spring secured to said disc across the top thereof,
    said leaf spring extending into said opposing slots in said cylindrical element for rotating said disc with rotation of said anemometer housing,
    said leaf spring said cylindrical elements and said cap cooperating to apply a pressure on said flat face disc to produce a frictional contact with said oil saturated means, whereby adjustment of said cap relative to said housing adjusts the pressure on said flat face disc thereby adjusting the frictional force between said flat face disc and said oil saturated means.

2. A damping means as claimed in claim 1; which includes
    a spacer means
    said spacer means cooperating with said cylindrical element secured within said cap for restricting the axial movement of said cap relative to said housing thereby controling the frictional force between said oil saturated m means and said flat face disc.

3. A damping means as claimed in claim 1; in which, said oil saturated means is an oilite disc.

4. A damping means as claimed in claim 3, wherein, said oilite disc is formed of porous bronze, and said disc includes a central aperture therein which forms a reservoir for oil.

* * * * *